Sept. 15, 1936.　　　S. S. HORNER　　　2,054,751
TRACTOR AND PLOW COUPLING
Filed June 5, 1936　　　3 Sheets-Sheet 1
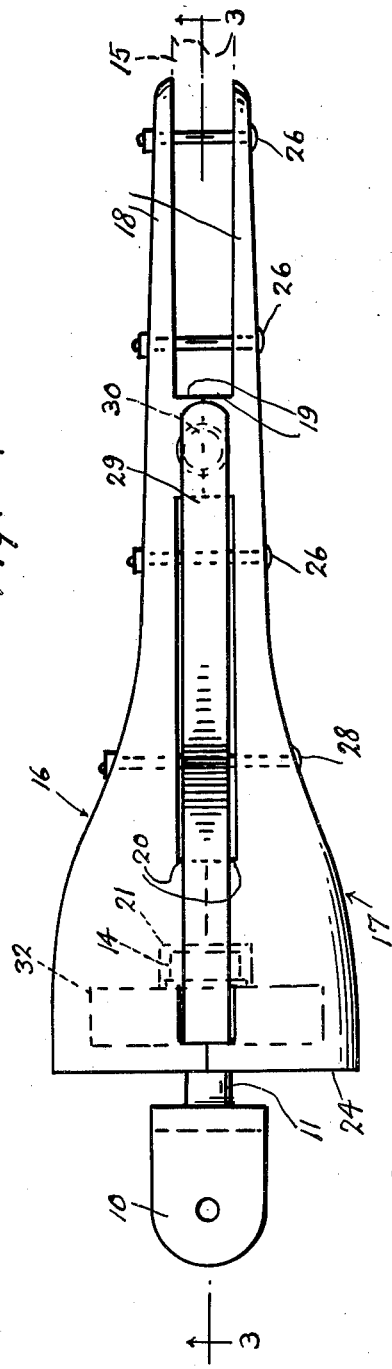
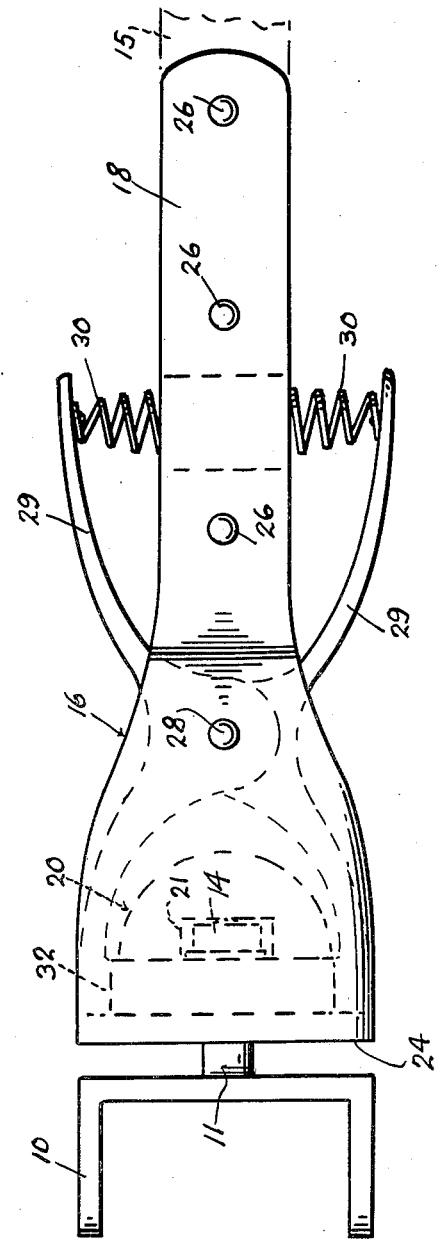
Inventor
S. S. Horner
By Clarence A. O'Brien and
Hyman Berman
Attorney.

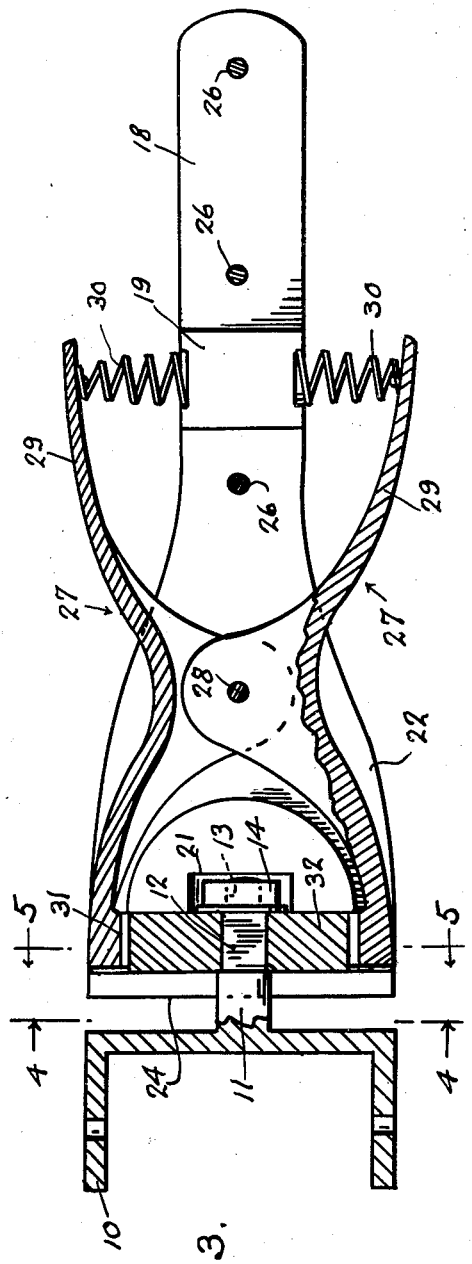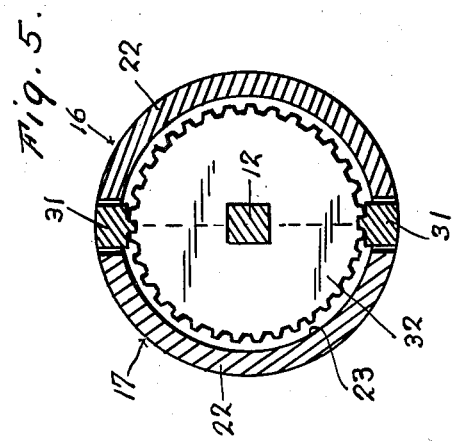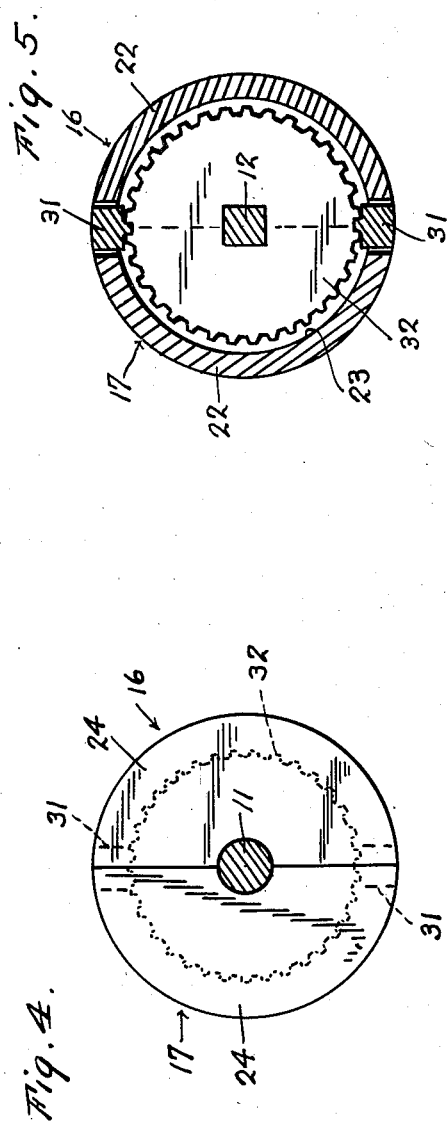

Sept. 15, 1936. S. S. HORNER 2,054,751
TRACTOR AND PLOW COUPLING
Filed June 5, 1936    3 Sheets-Sheet 3
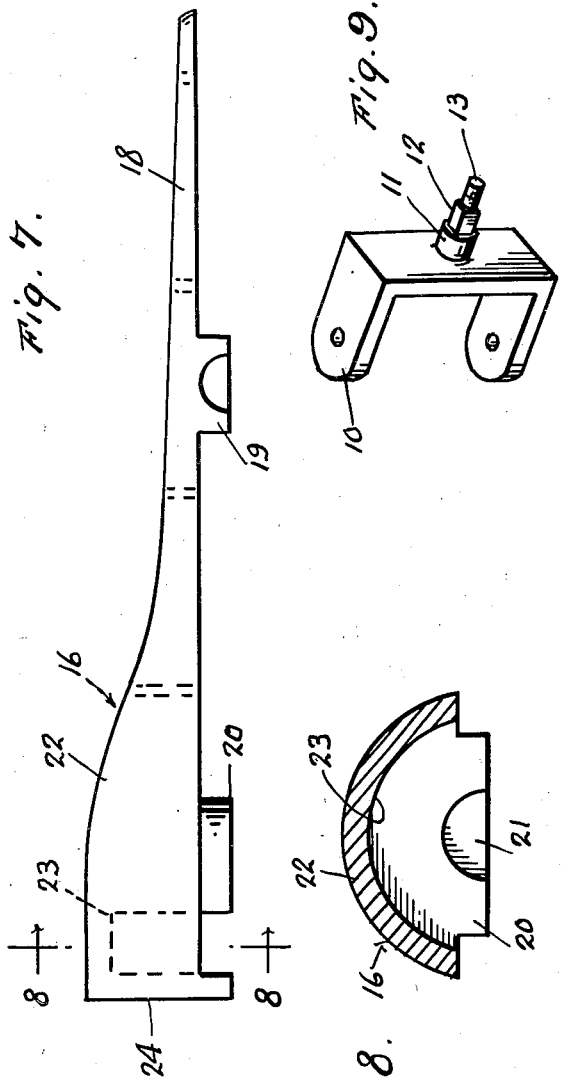

Patented Sept. 15, 1936

2,054,751

UNITED STATES PATENT OFFICE 2,054,751

TRACTOR AND PLOW COUPLING

Samuel S. Horner, Bellefonte, Pa.

Application June 5, 1936, Serial No. 83,770

1 Claim. (Cl. 280—33.15)

This invention relates to a structure which I have personally typified as a lock-type swivel hitch, though, as the title implies, it is possibly more aptly classifiable under the general heading of a tractor and plow coupling inasmuch as it is especially designed for operatively connecting different kinds of plows to present day two-wheeled tractors and similar power vehicles.

Needless to say, there are various types of draft connections and so-called tractor hitches in use. Those with which I am familiar, however, have been found lacking in compensating properties when the tractor and plow are traveling simultaneously in different planes on irregular surfaces. The purpose of the present swivel-type coupling is, therefore, to permit the plow to be leveled when the tractor is on a side hill, and to permit the operator to plow almost anywhere in the field with present day sulky and gang plows.

The outstanding object of the invention is to provide a structure susceptible of accomplishing the desired results wherein the same is devoted to a simple and economical coordination of mechanical features including the relatively rotatable or swivelly connected parts, and spring-retained, manually-released latch and retaining means suitable to maintain said part normally against relatively axial rotation.

Other features and advantages will become more readily apparent from the following description and accompanying illustrative drawings.

In the drawings, wherein like numerals are employed to designate corresponding details or parts throughout the views:

Figure 1 is what may be designated as a side elevational view of the plow and tractor coupling or hitch constructed in accordance with the principles of the present invention;

Figure 2 is a top plan view of the same;

Figure 3 is a longitudinal sectional view, partly in section and partly in elevation, the view being taken approximately on the plane of the line 3—3 of Figure 1;

Figures 4 and 5 are transverse or cross-sectional views taken on the planes of the lines 4—4 and 5—5, respectively, of Figure 1, looking in the direction of the arrows;

Figure 6 is a plan view of one of the half-sections of the body portion of the structure;

Figure 7 is an edge elevational view of said half-section appearing in Figure 6;

Figure 8 is a cross-section on the line 8—8 of Figure 7.

Figure 9 is a perspective view of the tractor yoke, that is, the part which is connected to the tractor (not shown).

The part or unit which is adapted for connection with a conventional attaching device on the tractor (not shown) is in the form of a U-shaped member or yoke, as illustrated in Figure 9 and denoted by the numeral 10. It comprises a stub shaft 11 having a reduced polygonal or square portion 12 and a further reduced nut attaching shank 13 which is screw-threaded to accommodate the assembling and retaining nut 14, as shown in Figure 3.

The plow beam is denoted by the numeral 15 and is of regular or standard style, whereby to permit the plow (not shown) to be connected with the tractor. As before indicated, it is the purpose of the connecting means between the part 10 and the part 15 to provide an adjustable swivel joint. This is intended to allow the plow to level itself in respect to the traveling position of the tractor or other power vehicle to permit proper relative adjustments for varying land traveling conditions.

The body portion forming the jointing or coupling means is of longitudinally elongated design and proper proportions and is composed essentially of a pair of companion duplicate half-sections differentiated by the numerals 16 and 17. Each half-section is provided with a shank portion 18 and spacing lugs or abutments 19 and 20. The lug 19 is of block-like form and the lug 20 somewhat segmental in design, and this lug is provided with a cavity or recess to accommodate the nut 14, the cavity being denoted by the numeral 21. The frontal or forward end of the section is somewhat enlarged to describe what might be called a head 22, and this is provided with a substantially semi-circular recess 23 and a semi-disk end plate 24. The plate 24 has a notch 25 to accommodate the cylindrical or spindle portion 11 of the aforesaid stub shaft. The sections are secured together by bolts or the like 26 in superposed companionate relationship with the respective lugs or abutments 19 and 20 in contact with each other as shown in Figure 1. The spaced parallel shanks 18 serve to accommodate the plow beam 15 as illustrated in Figure 1. The space between the lugs 19 and the lugs 20 serves to accommodate a pair of duplicate levers 27. The central portions of the levers are pivotally connected together as indicated at 28 and the projecting end portions 29 form handles. Coiled springs 30 are interposed between the handles and the abutting lugs 19, the lugs being constructed to properly retain the springs in operative relationship. The toothed grips 31 forming the jaws on the levers are positioned to register with appropriate clearance notches in the head portion 22 as shown better in Figure 1. These spring-pressed grips or jaws project into the circular recess formed by the features 23 in which recess a circular locking gear wheel 32 is located. This gear wheel is keyed on the polygonal shank portion 12 of the attaching yoke 10.

Normally the device as shown in the drawings has the respective parts of the structure locked together through the instrumentality of the gear 32 and the locking jaws or latches 31. Under such circumstances we have what is equivalent to a substantially solid jointing device between the tractor and plow. When, however, it is necessary to adjust the plow, that is, to vary the level thereof with respect to the tractor, this is done by pressing the handles 29 in toward each other against the tension of the springs 30 whereby to release the jaws 31 and to allow the entire sectional body including the levers to be turned axially to the desired position.

Briefly and broadly, I have a swivel-type coupling, one unit of which is attachable to the tractor and the other unit to the plow, the two units being normally locked together by mechanical manually-released retaining or locking means. Thus, to effect the desired adjustment, the retaining means is momentarily released whereupon said units may be rotated one with respect to the other to vary the position of the plow beam in relation to the traveling plane of the tractor. As before indicated, it is possible with this device to substantially level the plow with respect to the tractor, even when the tractor is traveling on a hillside or ground out of line with a normal flat surface.

Specific novelty is thought to reside in the provision of a yoke or equivalent unit attachable to the tractor, the same being provided with a spindle or stub shaft carrying a gear, in conjunction with a sectional body or unit constructed to house the gear and itself equipped with the spring-retained levers or jaws. Additional novelty is attached to the spaced parallel companion or duplicate sections forming the upper and lower halves of the peculiarly shaped but satisfactorily designed body forming a holder or carrier for the spring-pressed grip devices, as well as a housing or special adapter for the locking gear or toothed wheel 32.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

As a component unit in a coupling assemblage of the class described, a pair of duplicate sections provided with longitudinally spaced spacing lugs on their inner opposed faces, said units being disposed in superposed relationship and the respective lugs engaged with each other, said units being constructed at corresponding ends to facilitate connection with a plow beam, the opposite ends thereof being formed into heads, said heads terminating in complementary semi-circular outwardly spaced end plates forming a closure, said units being formed inwardly of said plates with recesses combining to form a circular cavity, a coupling member including a shaft having a gear wheel keyed thereon, said gear wheel positioned in said cavity, and a pair of duplicate levers pivotally mounted intermediate their ends between said units, said levers being formed with outwardly projecting handles and associated expansion springs, the opposite ends of the levers being operable between corresponding ends of said units and formed with toothed heads engageable with the gear wheel to releasably secure the coupling member and the units in a predetermined fixed relationship.

SAMUEL S. HORNER.